July 3, 1928.  1,675,705

LE ROY H. HOFFER

ELECTRIC WELDING MACHINE

Original Filed April 10, 1924    2 Sheets-Sheet 1

INVENTOR
LEROY H. HOFFER.
BY
R. Anthony Using ATTORNEY

July 3, 1928. 1,675,705
LE ROY H. HOFFER
ELECTRIC WELDING MACHINE
Original Filed April 10, 1924  2 Sheets-Sheet 2
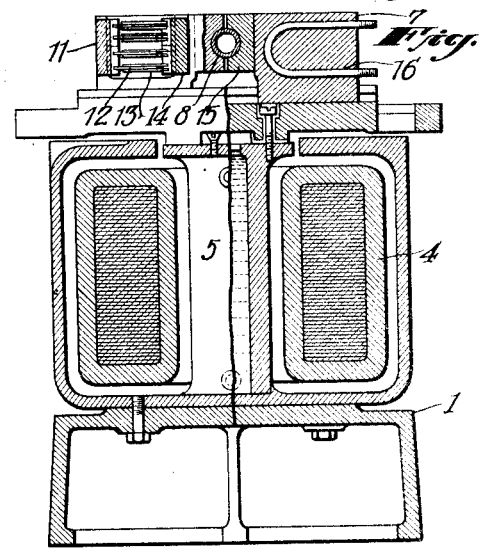
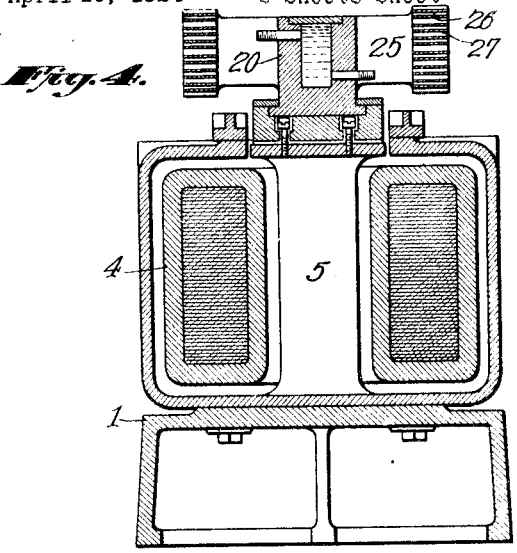
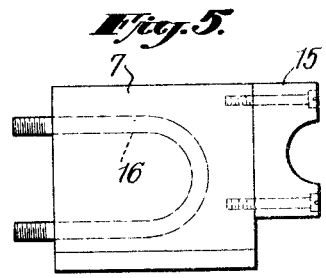
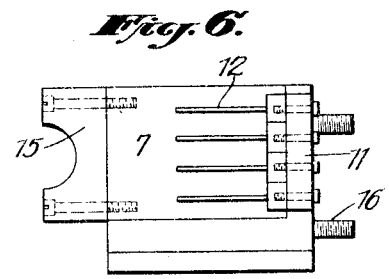
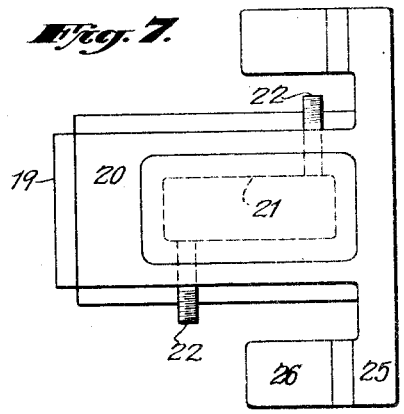
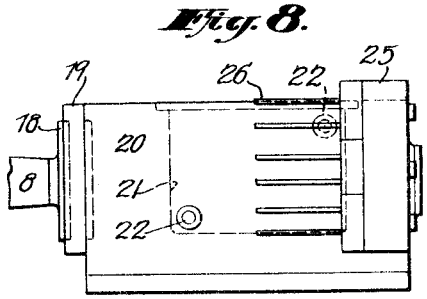
INVENTOR
LEROY H. HOFFER.
BY
L. Anthony Usina ATTORNEY Patented July 3, 1928.

1,675,705

UNITED STATES PATENT OFFICE.

LE ROY H. HOFFER, OF BROOKLYN, NEW YORK, ASSIGNOR TO THOMAS E. MURRAY, OF BROOKLYN, NEW YORK.

ELECTRIC WELDING MACHINE.

Original application filed April 10, 1924, Serial No. 705,419. Divided and this application filed August 13, 1927. Serial No. 212,621.

In my application No. 705,419 filed April 10, 1924, there is described a machine for performing certain welding operations. The present application is a division thereof directed particularly to the electrodes and related parts which is capable of use in various other machines besides that of the parent application. The object of the invention is to provide a convenient and safe arrangement of the electrodes and their circuit-connecting devices.

The accompanying drawings illustrate embodiments of invention.

Fig. 3 is a vertical section on the line 3—3 of Fig. 2;

Fig. 4 is a vertical section on the line 4—4 of Fig. 1;

Figs. 5 and 6 are opposite side elevations of a clamping electrode;

Figs. 7 and 8 are respectively a plan and side elevation of an end electrode.

Figure 1:
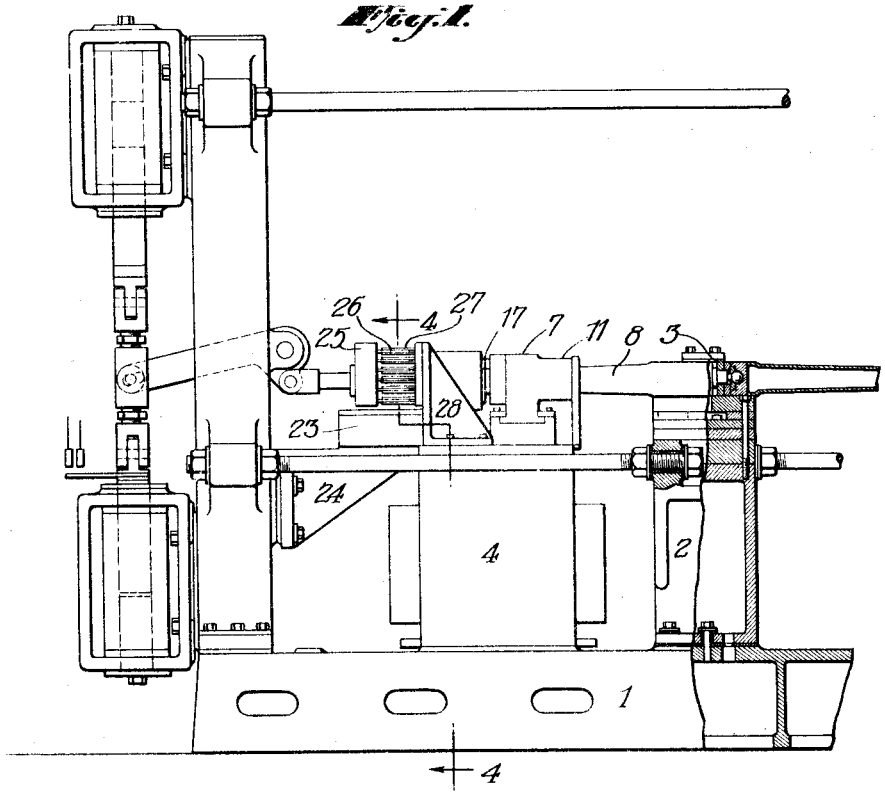
Fig. 1 is a side elevation partly in section illustrating one end of the machine.
Figure 2:
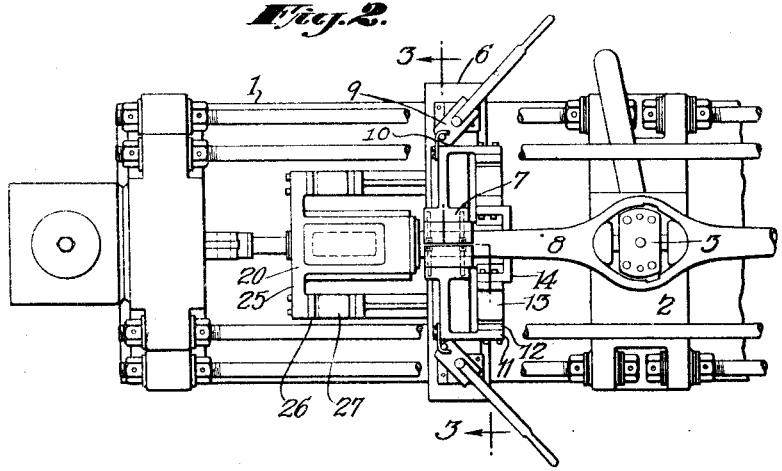
Fig. 2 is a plan of Fig. 1.

The machine is provided with two sets of welding mechanisms at opposite ends of the head. Only one of these is illustrated, the opposite one being substantially identical. The purpose of each welding mechanism is to weld an end plate or flange on a differential housing. The drawings show the positions of the parts at the completion of the weld.

Upon the upright bed 1 is a casting 2 on which is an internal chuck 3 to hold the housing at the centre. The transformer 4 has its core 5 fastened to the bed of the machine as shown in Fig. 3.

Mounted on the transformer are two transverse guides 6 in which clamping electrodes 7 slide transversely so as to clamp between them an end of the work 8. The electrodes are forced laterally inward by hand-operated cams 9 which carry pins engaging hooks 10 for withdrawing the electrodes. The electrodes at their outer ends have forwardly projecting arms 11 which carry inwardly projecting switch blades 12 which in the clamped welding position engage switch blades 13 carried by a fixed bracket 14 which is mounted on the transformer and connected to a terminal thereof. On its face each of these electrodes has a block 15 recessed for direct engagement and clamping of the work. Its body portion may be water cooled as by means of a U-shaped pipe 16 cast in the electrode at the foundry. The outer and inner faces of one of these electrodes are shown separately in Figs. 5 and 6.

The purpose of the machine is to apply end plates 17 to the ends of the housing 8. The end plates have a tubular flange which is brought to abut against the ends of the housing 8. The abutting edges are pressed together while a welding current is passed across the joint. The machine is designed particularly for the Murray method of welding which consists in passing a current of extraordinarily high amperage or density for a very brief period of time (Reissue No. 15,466, dated October 10, 1922). Such an end plate is shown at 18 (Fig. 8) held in place in a recessed block 19 on the end of an electrode 20 which is water cooled by means of a central recess 21 and pipes 22 for circulating water therethrough.

Each of these end electrodes is mounted to slide longitudinally on a plate 23 (Fig. 1) which is supported on a bracket 24 and insulated from the transformer. The electrode has lateral arms 25 at both sides carrying forwardly extending switch blades 26 which in the advanced position engage blades 27 carried in pairs on brackets 28 mounted on the top of the transformer and connected with one of its terminals (the terminal opposite to that which leads to the clamping electrodes) so that when the end plate and the housing are brought together and the circuit is closed the welding current is passed across the joint.

The provision of a number of switch blades along the sides of the moving electrode serves to equalize the distribution of the current to different parts of the electrode and around the end plate. Similarly the provision of a number of switch blades across the width of the clamping electrodes tends to equalize the distribution of current from top to bottom of the end blocks thereof, and around the circumference of the work. This is of particular importance where the period of current application is extremely short.

The end electrode has a rearwardly extending stem connected to a lever actuated by certain solenoids for pushing the electrode forward or retracting it. This mechanism is described in full in the parent application.

In operating the machine, the housing and the end plates are put in position, the clamping electrodes 7 are pressed inward about the ends of the housing. The solenoids are then energized to put a continuing pressure on the end electrodes and finally the primary circuit of the transformers is closed so as to cause a welding current to flow through the electrodes. The pressure on the end electrodes continues and these are advanced until at a certain point the primary circuit of the transformers is broken.

The pressure on the work may be continued while it is cooling after the welding current is off. Finally the controls are operated to relieve the pressure and to retract the end electrodes and the clamping electrodes. The completed housing is then taken out and a new one introduced for the next cycle of operations.

The supports for the movable electrodes, the clamping electrodes 7 and the end electrodes 20 are insulated from the secondary transformer. This permits the making of the supporting plates and the sliding bearings of steel or brass which have a better wearing quality than copper. The electrodes themselves will generally be of copper.

Various modifications may be made by those skilled in the art without departing from the invention as defined in the following claims.

What I claim is:

1. In a welding machine for tubular work the combination of electrodes at opposite sides of the work and movable toward each other to engage and clamp the work between them, switch blades carried by said electrodes at different points in their cross section so as to equalize the distribution of current, a transformer and two sets of stationary switch blades connected to one terminal of the transformer and located in positions to be engaged by the switch blades carried by the respective electrodes as the latter are moved toward each other so as to distribute the current equally to the two electrodes and the opposite sides of the work.

2. In a welding machine for tubular work the combination of electrodes at opposite sides of the work and movable toward each other to engage and clamp the work between them, switch blades carried by said electrodes at different points in their cross section so as to equalize the distribution of current, a transformer and two sets of stationary switch blades connected to one terminal of the transformer and located in positions to be engaged by the switch blades carried by the respective electrodes as the latter are moved toward each other so as to distribute the current equally to the two electrodes and the opposite sides of the work, and an endwise movable electrode adapted to carry a workpiece to be welded to the end of the tubular part of the work, said endwise movable electrode having similar switch blades and correspondingly located stationary switch blades connected to the other terminal of the transformer and co-operating with the switch blades of said endwise movable electrode.

In witness whereof I have hereunto signed my name.

LE ROY H. HOFFER.